US012767452B2

(12) United States Patent
Nakagawa et al.

(10) Patent No.: US 12,767,452 B2
(45) Date of Patent: Oct. 20, 2026

(54) CONVEYANCE DEVICE

(71) Applicant: DAIFUKU CO., LTD., Osaka (JP)

(72) Inventors: Ryo Nakagawa, Shiga (JP); Jun Tanaka, Shiga (JP)

(73) Assignee: Daifuku Co., Ltd., Osaka (JP)

( * ) Notice: Subject to any disclaimer, the term of this patent is extended or adjusted under 35 U.S.C. 154(b) by 87 days.

(21) Appl. No.: 19/014,622

(22) Filed: Jan. 9, 2025

(65) Prior Publication Data

US 2025/0320068 A1 Oct. 16, 2025

(30) Foreign Application Priority Data

Apr. 16, 2024 (JP) ................................ 2024-066310

(51) Int. Cl.
*B65G 35/06* (2006.01)
*B65G 43/04* (2006.01)

(52) U.S. Cl.
CPC ............ *B65G 43/04* (2013.01); *B65G 35/06* (2013.01); *B65G 2203/0275* (2013.01)

(58) Field of Classification Search
CPC ...... B65G 1/0492; B65G 35/06; B65G 43/04; B65G 2203/0266; B65G 2203/042; B65G 2203/0275
See application file for complete search history.

(56) References Cited

U.S. PATENT DOCUMENTS

| | | | | |
|---|---|---|---|---|
| 11,999,563 | B2 * | 6/2024 | Tsuji | B65G 1/0421 |
| 12,275,309 | B2 * | 4/2025 | Lee | B60L 15/002 |
| 2008/0133102 | A1 | 6/2008 | Kubo | |

FOREIGN PATENT DOCUMENTS

| | | | | |
|---|---|---|---|---|
| EP | 1473205 | A2 * | 11/2004 | B61B 13/127 |
| EP | 3812304 | A1 * | 4/2021 | G01D 5/24461 |
| JP | 2004-075348 | A | 3/2004 | |
| JP | 2004-287555 | A | 10/2004 | |
| JP | 2005-263358 | A | 9/2005 | |
| JP | 2008-140144 | A | 6/2008 | |
| JP | 2008-254912 | A | 10/2008 | |
| WO | WO-2012083060 | A1 * | 6/2012 | B65G 1/0492 |
| WO | WO-2017152210 | A1 * | 9/2017 | B65G 1/065 |
| WO | WO-2021059006 | A1 * | 4/2021 | B65G 1/065 |
| WO | WO-2021238612 | A1 * | 12/2021 | B62D 63/04 |
| WO | WO-2025255445 | A1 * | 12/2025 | B65G 1/0492 |

OTHER PUBLICATIONS

US 2024/0010250 A1, Otsuka, Jan. 11, 2024.*
US 2024/0017395 A1, Wu et al., Jan. 18, 2024.*
US 2025/0236462 A1, Hempstead et al., Jul. 24, 2025.*
Office Action dated Jun. 2, 2026 issued in Japanese patent application No. 2024-066310.

* cited by examiner

*Primary Examiner* — Douglas A Hess
(74) *Attorney, Agent, or Firm* — Harness, Dickey & Pierce, P.L.C.

(57) ABSTRACT

A conveyance device includes a traveling vehicle, a mast, a raising and lowering section, and a control section. The traveling vehicle includes a wheel, a motor which drives the wheel, and a slippage detection section which detects slippage at the wheel. In a case where two or more slippage detection sections out of the slippage detection sections detect, at least in a state where the traveling vehicle is accelerated, slippage of not less than a predetermined amount, the control section causes the traveling vehicle to stop.

4 Claims, 5 Drawing Sheets

CONVEYANCE DEVICE

This Nonprovisional application claims priority under 35 U.S.C. § 119 on Patent Application No. 2024-066310 filed in Japan on Apr. 16, 2024, the entire contents of which are hereby incorporated by reference.

TECHNICAL FIELD

The present disclosure relates to a conveyance device which conveys an object to be conveyed (conveyance object).

BACKGROUND ART

Conventionally, in an automatic warehouse, an article is conveyed by a stacker crane. It is known that, in the stacker crane, slippage occurs at a wheel of a traveling vehicle (see, for example, Patent Literature 1).

CITATION LIST

Patent Literature

[Patent Literature 1]
Japanese Patent Application Publication, Tokukai, No. 2008-254912

SUMMARY OF INVENTION

Technical Problem

Note here that there has been the following problem. That is, for example, in a case where control is carried out to stop the traveling vehicle when slippage occurs at a front wheel or a rear wheel of the traveling vehicle, efficiency with which the traveling vehicle conveys a conveyance object is reduced.

An aspect of the present disclosure has an object to provide a conveyance device with which reduction in efficiency with which the traveling vehicle conveys a conveyance object can be suppressed.

Solution to Problem

In order to attain the above object, a conveyance device in accordance with an aspect of the present disclosure includes: a traveling vehicle which travels along a track; a mast provided to the traveling vehicle in a standing manner; a raising and lowering section which holds a conveyance object and which is raised and lowered along the mast; and a control section. The traveling vehicle includes a plurality of driving units each including a wheel which rolls on the track, a motor which drives the wheel, and a slippage detection section which detects slippage at the wheel. The control section causes the traveling vehicle to stop, in a case where two or more slippage detection sections out of the slippage detection sections detect, at least in a state where the traveling vehicle is accelerated, slippage of not less than a predetermined amount at the wheels.

Advantageous Effects of Invention

In accordance with an aspect of the present disclosure, it is possible to suppress reduction in efficiency with which the traveling vehicle conveys a conveyance object.

DESCRIPTION OF EMBODIMENTS

The following will describe embodiments of the present disclosure with reference to FIGS. 1 to 5.

[Schematic Configuration of Stacker Crane]

Figure 1:
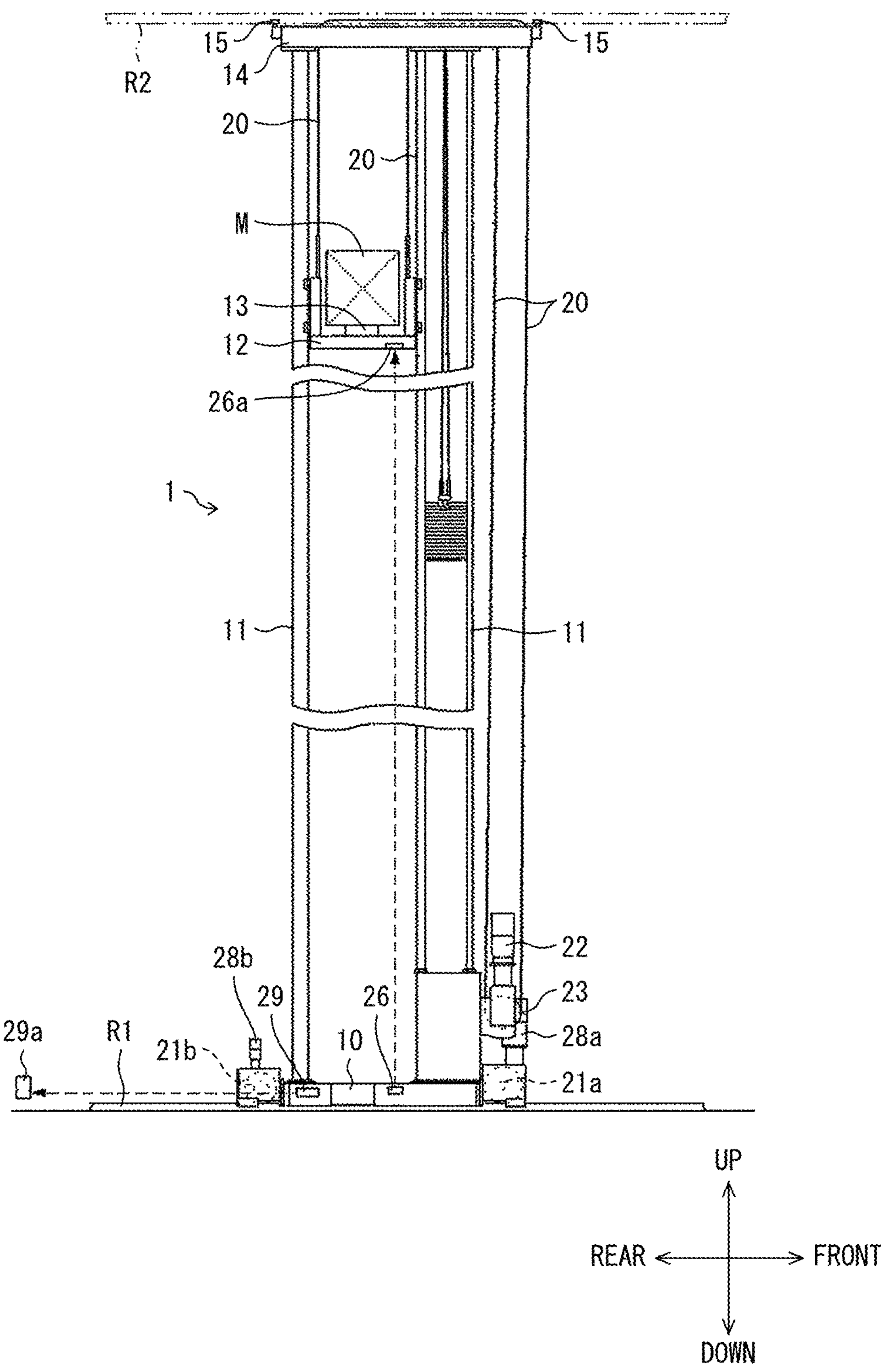
FIG. 1 is a front view of a stacker crane in accordance with an embodiment of the present disclosure.

FIG. 1 is a front view of a stacker crane 1. The stacker crane 1 is an example of a conveyance device which conveys a conveyance object in an automatic warehouse or the like. As shown in FIG. 1, the stacker crane 1 includes a traveling vehicle 10, a pair of masts 11, a raising and lowering section 12, and a transfer device 13.

For convenience of explanation, an up-down direction and a front-rear direction of the stacker crane 1 are defined as indicated by the arrows shown in FIG. 1. Further, a front side of a sheet of FIG. 1 is defined as a right side of the stacker crane 1, and a back side of the sheet of FIG. 1 is defined as a left side of the stacker crane 1. The up-down direction of the stacker crane 1 corresponds to a direction in which the raising and lowering section 12 is raised and lowered. The front-rear direction of the stacker crane 1 corresponds to a direction in which the traveling vehicle 10 travels.

The traveling vehicle 10 travels along a track in a traveling direction, that is, the front-rear direction. The track is made of a traveling rail R1. The traveling vehicle 10 includes a first wheel 21*a* and a second wheel 21*b*. The traveling vehicle 10 travels on the traveling rail R1 due to rotation of the first wheel 21*a* and rotation of the second wheel 21*b*. Each of the first wheel 21*a* and the second wheel 21*b* is an example of a wheel which rolls on the track.

The first wheel 21*a* is provided to a front side of the traveling vehicle 10. The second wheel 21*b* is provided to a rear side of the traveling vehicle 10. The first wheel 21*a* is driven by a first traveling motor 28*a*. The second wheel 21*b* is driven by a second traveling motor 28*b*. Each of the first traveling motor 28*a* and the second traveling motor 28*b* is an example of a motor which drives the wheel.

The pair of masts 11 is provided to an upper portion of the traveling vehicle 10 in a standing manner. The masts 11 are arranged so as to be away from each other in the front-rear direction and so as to extend in the up-down direction. Each of the masts 11 is made of a hollow member which is elongated in the up-down direction.

The paired masts 11 respectively have upper ends which are connected to each other via an upper frame 14. The upper frame 14 has a guide roller 15. The guide roller 15 is guided by a guide rail R2 which is fixed to a ceiling (not illustrated). The upper frame 14 is configured to be capable of traveling in the front-rear direction by being guided by the guide rail R2.

The raising and lowering section 12 is supported by the pair of masts 11, and is raised and lowered in the up-down direction along the masts 11. The raising and lowering section 12 is suspended and supported by four wires 20 which are wound around a rotating body 23. The traveling vehicle 10 has a single raising and lowering motor 22, which is provided to a front portion of the traveling vehicle 10. When the raising and lowering motor 22 is driven so as to cause the rotating body 23 to rotate in a forward direction or a reverse direction, each of the wires 20 is wound or fed so as to cause the raising and lowering section 12 to be raised or lowered along the masts 11. Note that two raising and lowering motors 22 may be respectively provided to a front portion and a rear portion of the traveling vehicle 10.

The transfer device 13 is supported by the raising and lowering section 12. The transfer device 13 has a fork mechanism (not illustrated) for holding a conveyance object M. The transfer device 13 causes the fork mechanism to extend or retract, so as to allow the conveyance object M to be placed in a predetermined transfer position in a storage section (not illustrated).

The traveling vehicle 10 is provided with a raising and lowering sensor 26. The raising and lowering sensor 26 detects a position, in the up-down direction, of the raising and lowering section 12. The raising and lowering sensor 26 detects a distance to the raising and lowering section 12 by (a) emitting a laser beam in the up-down direction toward a reflection panel 26*a* disposed on a lower surface of the raising and lowering section 12 and (b) receiving the light reflected by the reflection panel 26*a*, thereby detecting the position, in the up-down direction, of the raising and lowering section 12. In the description here, the raising and lowering sensor 26 is a laser-type distance sensor. However, the present invention is not limited to this. The raising and lowering sensor 26 may be a bar code type distance meter.

The traveling vehicle 10 is further provided with a traveling sensor 29. The traveling sensor 29 is an example of a position detecting section which detects a position of the traveling vehicle 10 along the track. The traveling sensor 29 detects a distance to a reflection panel 29*a* by (a) emitting a laser beam along a longitudinal direction of the traveling rail R1 toward the reflection panel 29*a* disposed at one end of the traveling rail R1 and (b) receiving the light reflected by the reflection panel 29*a*, thereby detecting the position of the traveling vehicle 10.

[Electrical Configuration of Stacker Crane]

Figure 2:
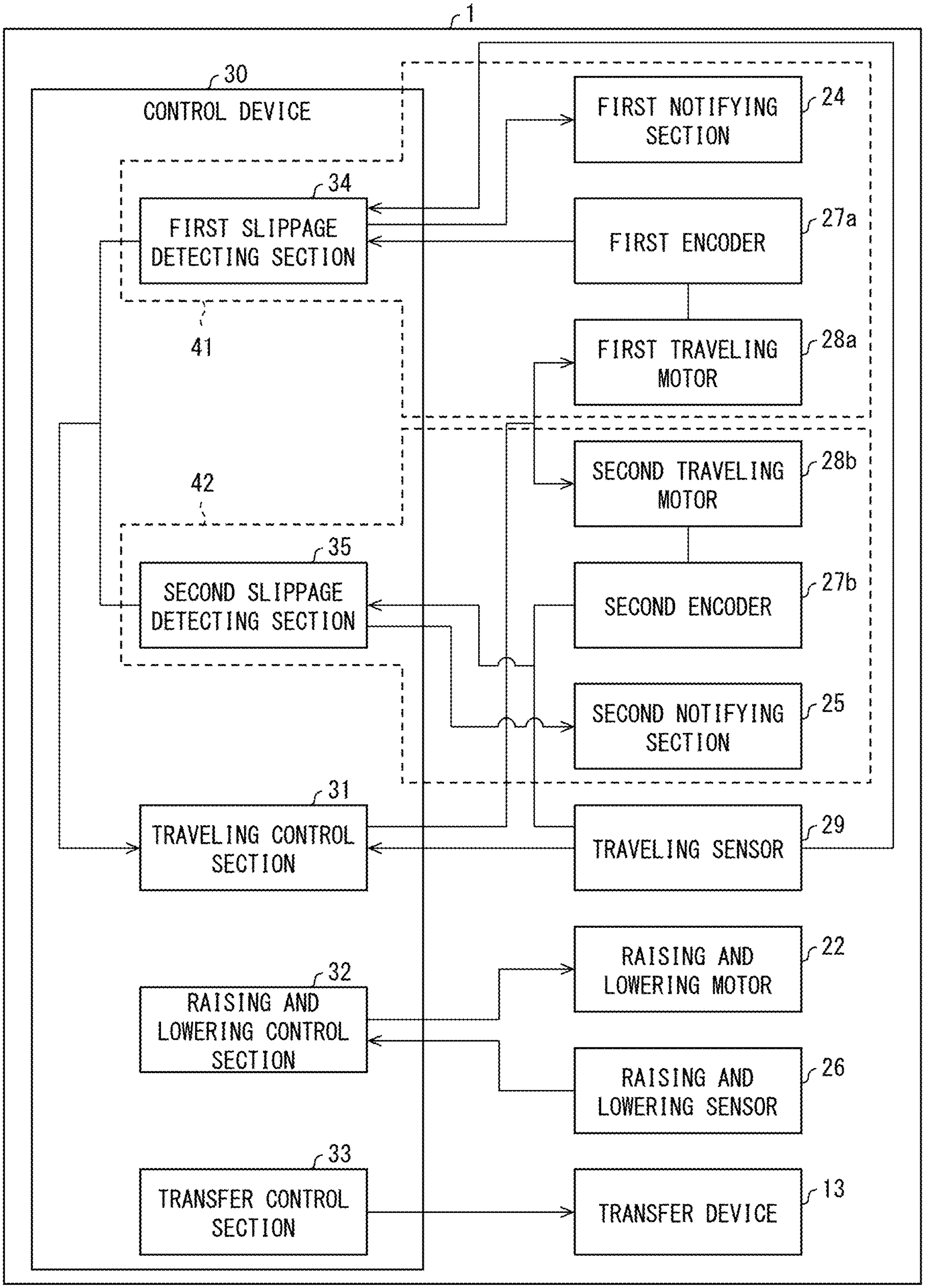
FIG. 2 is a block diagram illustrating an electrical configuration of the stacker crane in accordance with the embodiment.

Next, the following will describe an electrical configuration of the stacker crane 1 with reference to FIG. 2. FIG. 2 is a block diagram illustrating the electrical configuration of the stacker crane 1. As shown in FIG. 2, the stacker crane 1 includes a first notifying section 24, a second notifying section 25, a first encoder 27*a*, a second encoder 27*b*, and a control device 30.

The first notifying section 24 is a section which notifies a user that slippage has occurred at the first wheel 21*a*, in a case where slippage at the first wheel 21*a* is detected by a first slippage detecting section 34. The first notifying section 24 is constituted by, for example, a speaker which outputs sound and a display which indicates an error code and/or the like.

The second notifying section 25 is a section which notifies a user that slippage has occurred at the second wheel 21*b*, in a case where slippage at the second wheel 21*b* is detected by a second slippage detecting section 35. The second notifying section 25 is constituted by, for example, a speaker which outputs sound and a display which indicates an error code and/or the like.

The first encoder 27*a* is, for example, a rotary encoder which is disposed in the vicinity of the first traveling motor 28*a* and which detects the number of rotations of the first traveling motor 28*a*. The first encoder 27*a* outputs, to the first slippage detecting section 34, a signal corresponding to the number of rotations of the first traveling motor 28*a*.

The second encoder 27*b* is, for example, a rotary encoder which is disposed in the vicinity of the second traveling motor 28*b* and which detects the number of rotations of the second traveling motor 28*b*. The second encoder 27*b* outputs, to the second slippage detecting section 35, a signal corresponding to the number of rotations of the second traveling motor 28*b*.

The control device 30 includes a traveling control section 31, a raising and lowering control section 32, a transfer control section 33, the first slippage detecting section 34, and the second slippage detecting section 35. The control device 30 controls operation of the sections of the stacker crane 1.

The traveling control section 31 is an example of a control section which controls traveling operation of the traveling vehicle 10. The traveling control section 31 controls, on the basis of a detection result from the traveling sensor 29, driving of the first traveling motor 28*a* and the second traveling motor 28*b* so as to control traveling operation of the traveling vehicle 10.

The raising and lowering control section 32 controls, on the basis of a detection result from the raising and lowering sensor 26, driving of the raising and lowering motor 22 so as to control raising and lowering operation of the raising and lowering section 12, thereby shifting a position, in the up-down direction, of the transfer device 13 to a desired stop position.

The transfer control section 33 controls the fork mechanism so as to control transfer operation of the transfer device 13. In this manner, the control device 30 controls the traveling operation of the traveling vehicle 10, the raising and lowering operation of the raising and lowering section 12, and the transfer operation of the transfer device 13, so as to convey the conveyance object M into the storage section or to take the conveyance object M out of the storage section.

The first slippage detecting section 34 detects slippage at the first wheel 21*a* on the basis of (a) the number of rotations of the first traveling motor 28*a* detected by the first encoder 27*a* and (b) an amount of change of a position, in the traveling direction, of the traveling vehicle 10 detected by the traveling sensor 29.

The second slippage detecting section 35 detects slippage at the second wheel 21*b* on the basis of (a) the number of rotations of the second traveling motor 28*b* detected by the second encoder 27*b* and (b) an amount of change of a position, in the traveling direction, of the traveling vehicle 10 detected by the traveling sensor 29.

The first wheel 21*a*, the first notifying section 24, the first encoder 27*a*, the first traveling motor 28*a*, and the first slippage detecting section 34 constitute a first driving unit 41. The second wheel 21*b*, the second notifying section 25, the second encoder 27*b*, the second traveling motor 28*b*, and the second slippage detecting section 35 constitute a second driving unit 42. The first wheel 21*a* of the first driving unit 41 and the second wheel 21*b* of the second driving unit 42 are arranged at different positions, in the traveling direction, of the traveling vehicle 10.

[Electrical Configuration of Traveling Control Section]

Figure 3:
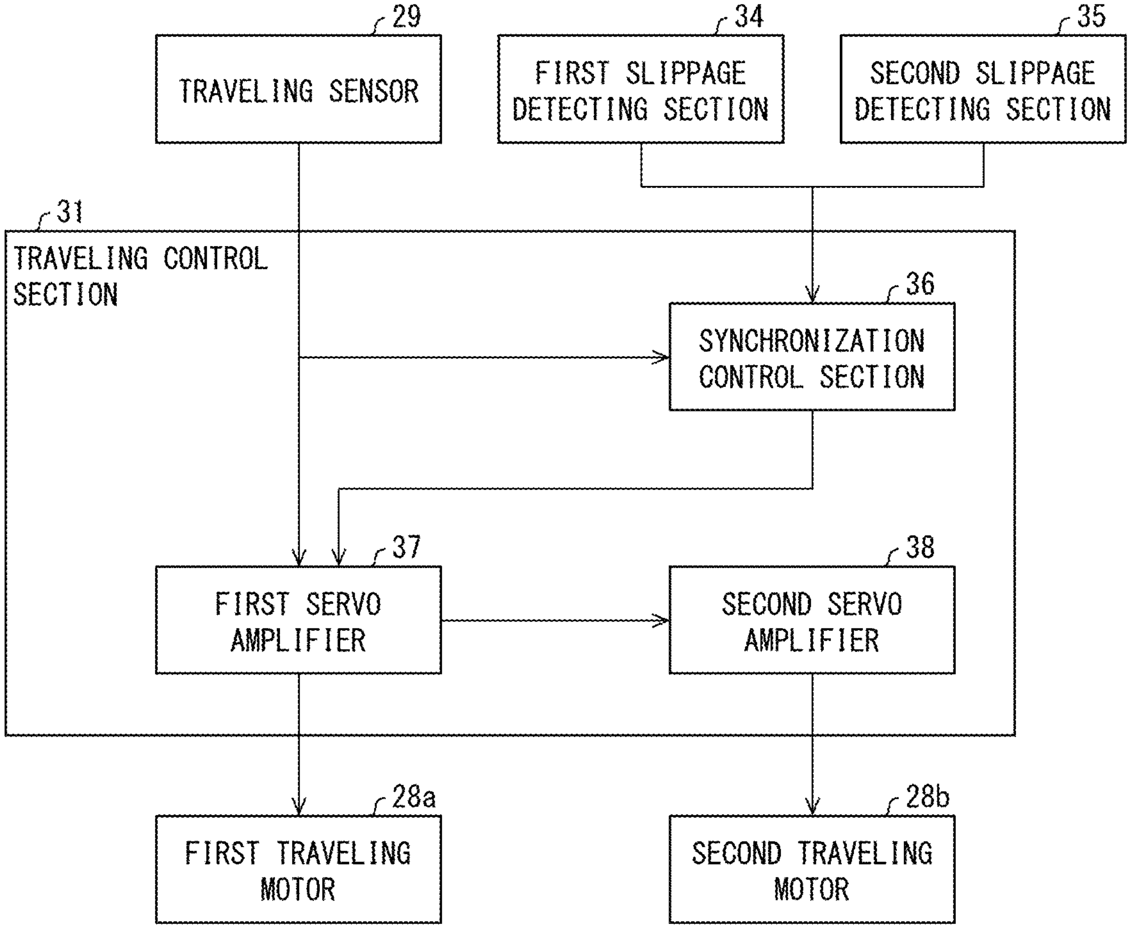
FIG. 3 is a block diagram illustrating an electrical configuration of a traveling control section in accordance with the embodiment.

Next, the following will describe, with reference to FIG. 3, details of an electrical configuration of the traveling control section 31. FIG. 3 is a block diagram illustrating the electrical configuration of the traveling control section 31. As shown in FIG. 3, the traveling control section 31 includes a synchronization control section 36, a first servo amplifier 37, and a second servo amplifier 38.

The synchronization control section 36 receives, from the first slippage detecting section 34, an abnormality signal indicating that slippage has occurred at the first wheel 21*a*, and receives, from the second slippage detecting section 35, an abnormality signal indicating that slippage has occurred at the second wheel 21*b*.

The synchronization control section 36 determines a traveling pattern of the traveling vehicle 10 on the basis of (a) a position, in the traveling direction, of the traveling vehicle 10 detected by the traveling sensor 29 and (b) a distance between the traveling vehicle 10 and a target stop position. Examples of the traveling pattern include an acceleration state, a constant speed state, and a deceleration state.

The synchronization control section 36 transmits, to the first servo amplifier 37, traveling speed instruction information which gives an instruction of a target traveling speed corresponding to the traveling pattern. The first servo amplifier 37 operates the first traveling motor 28*a* on the basis of a difference between (a) a traveling speed calculated according to changes in the traveling position per unit time detected by the traveling sensor 29 and (b) a target traveling speed from the synchronization control section 36.

The first servo amplifier 37 calculates a torque instruction value for making the above-described difference between the traveling speed and the target traveling speed 0 (zero), and supplies an electric current corresponding to the torque instruction value to the first traveling motor 28*a*, thereby controlling rotation of the first traveling motor 28*a*.

The first servo amplifier 37 gives the calculated torque instruction value to the second servo amplifier 38. The second servo amplifier 38 supplies, on the basis of the torque instruction value from the first servo amplifier 37, an electric current corresponding to the torque instruction value to the second traveling motor 28*b*, thereby controlling rotation of the second traveling motor 28*b*.

[Flow of Slippage Detecting Process by Control Device]

Figure 4:
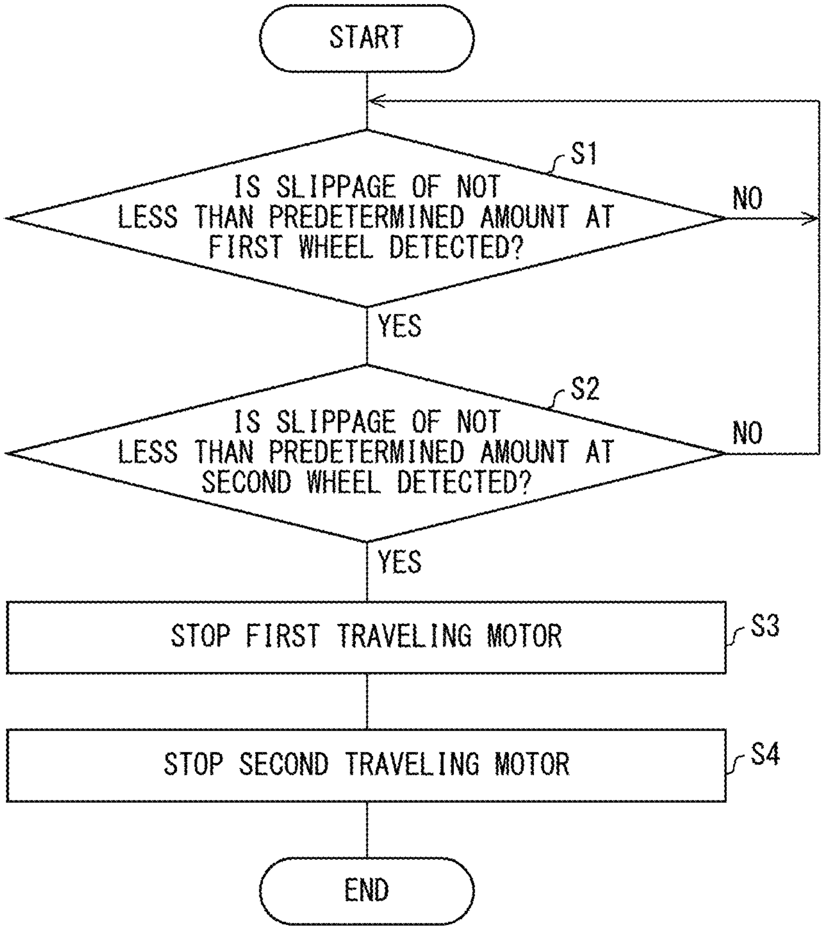
FIG. 4 is a flowchart illustrating an example of a flow of a slippage detecting process carried out by a control device in accordance with an embodiment.

Next, the following will describe, with reference to FIG. 4, a flow of a slippage detecting process carried out by the control device 30. FIG. 4 is a flowchart illustrating an example of the flow of the slippage detecting process carried out by the control device 30.

In the flowchart shown in FIG. 4, first, the first slippage detecting section 34 of the control device 30 determines whether or not slippage of not less than a predetermined amount at the first wheel 21*a* is detected (S1). In step S1, the first slippage detecting section 34 makes threshold determination by determining whether or not a difference between (a) a traveling distance of the traveling vehicle 10 calculated on the basis of the number of rotations of the first traveling motor 28*a* detected by the first encoder 27*a* and (b) an amount of change of a position, in the traveling direction, of the traveling vehicle 10 detected by the traveling sensor 29 is not less than a predetermined threshold.

Then, in a case where the difference between the calculated traveling distance of the traveling vehicle 10 and the amount of change of the position, in the traveling direction, of the traveling vehicle 10 is not less than the predetermined threshold, the first slippage detecting section 34 determines that slippage of not less than the predetermined amount has occurred at the first wheel 21*a*.

The first slippage detecting section 34 makes the above-described threshold determination every time the first traveling motor 28*a* makes predetermined rotation, for example, every time the first traveling motor 28*a* makes two rotations. Assume here that L1 (mm) denotes a traveling distance of the traveling vehicle 10, the traveling distance being based on two rotations of the first traveling motor 28*a*. For example, in a case where a difference between the traveling distance L1 (mm) of the traveling vehicle 10 and an amount of change of a position, in the traveling direction, of the traveling vehicle 10 detected by the traveling sensor 29 is not less than 0.4×L1 (mm), the first slippage detecting section 34 determines that slippage of not less than the predetermined amount has occurred at the first wheel 21*a*.

With this, it is possible to detect, at an early timing, occurrence of slippage of not less than the predetermined amount at the first wheel 21*a*. Further, by appropriately setting the threshold for the threshold determination, it is possible to more quickly detect occurrence of slippage of not less than the predetermined amount at the first wheel 21*a*.

In a case where the first slippage detecting section 34 does not detect slippage of not less than the predetermined amount at the first wheel 21*a* (S1: NO), step S1 will be carried out again. Meanwhile, in a case where the first slippage detecting section 34 detects slippage of not less than the predetermined amount at the first wheel 21*a* (S1: YES), the second slippage detecting section 35 determines whether or not slippage of not less than the predetermined amount at the second wheel 21*b* is detected (S2).

In step S2, the second slippage detecting section 35 makes threshold determination by determining whether or not a difference between (a) a traveling distance of the traveling vehicle 10 calculated on the basis of the number of rotations of the second traveling motor 28*b* detected by the second encoder 27*b* and (b) an amount of change of a position, in the traveling direction, of the traveling vehicle 10 detected by the traveling sensor 29 is not less than a predetermined threshold.

Then, in a case where the difference between the calculated traveling distance of the traveling vehicle 10 and the amount of change of the position, in the traveling direction, of the traveling vehicle 10 is not less than the predetermined threshold, the second slippage detecting section 35 determines that slippage of not less than the predetermined amount has occurred at the second wheel 21*b*.

The second slippage detecting section 35 makes the above-described threshold determination every time the second traveling motor 28*b* makes predetermined rotation, for example, every time the second traveling motor 28*b* makes two rotations. Assume here that L2 (mm) denotes a traveling distance of the traveling vehicle 10, the traveling distance being based on two rotations of the second traveling motor 28*b*. For example, in a case where a difference between the traveling distance L2 (mm) of the traveling vehicle 10 and an amount of change of a position, in the traveling direction, of the traveling vehicle 10 detected by the traveling sensor 29 is not less than 0.4×L2 (mm), the second slippage detecting section 35 determines that slippage of not less than the predetermined amount has occurred at the second wheel 21*b*.

With this, it is possible to detect, at an early timing, occurrence of slippage of not less than the predetermined amount at the second wheel 21*b*. Further, by appropriately setting the threshold for the threshold determination, it is possible to more quickly detect occurrence of slippage of not less than the predetermined amount at the second wheel 21*b*.

In a case where the second slippage detecting section 35 does not detect slippage of not less than the predetermined amount at the second wheel 21*b* (S2: NO), the process returns to step S1. Meanwhile, in a case where detection of slippage of not less than the predetermined amount at the second wheel 21*b* is detected (S2: YES), the traveling control section 31 controls the first servo amplifier 37 to stop rotation of the first traveling motor 28*a* (S3).

After step S3, the traveling control section 31 controls the second servo amplifier 38 to stop rotation of the second traveling motor 28*b* (S4). Consequently, the traveling vehicle 10 stops. As discussed above, the slippage detecting process carried out by the traveling control section 31 shown in FIG. 4 is ended.

In this manner, in a case where all the slippage detecting sections, i.e., the first slippage detecting section 34 and the second slippage detecting section 35 detect, at least in a state where the traveling vehicle is accelerated, slippage of not less than the predetermined amount, the traveling control section 31 causes the traveling vehicle 10 to stop.

[Flow of Sensor Abnormality Detection Process by Traveling Control Section]

Figure 5:
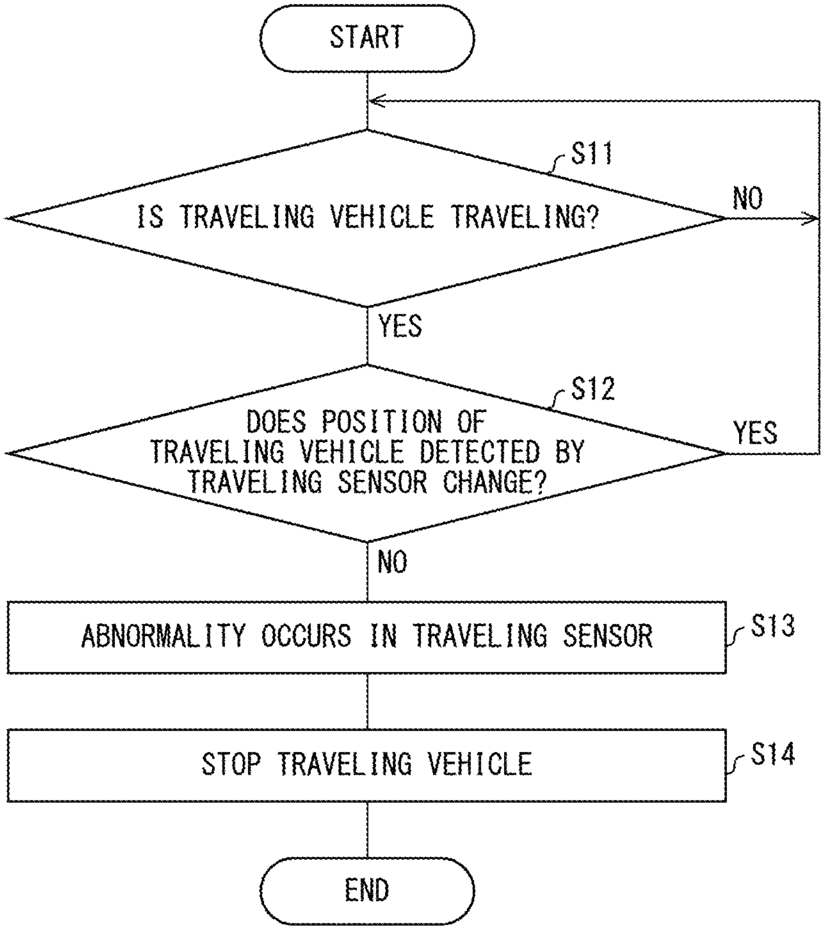
FIG. 5 is a flowchart illustrating an example of a flow of a sensor abnormality detection process carried out by a traveling control section in accordance with an embodiment.

Next, the following will describe, with reference to FIG. 5, a flow of a sensor abnormality detection process carried out by the traveling control section 31. FIG. 5 is a flowchart illustrating an example of a flow of the sensor abnormality detection process carried out by the traveling control section 31. In the present embodiment, the sensor abnormality detection process shown in FIG. 5 is executed at predetermined time periods, for example.

In the flowchart shown in FIG. 5, first, the traveling control section 31 determines whether or not the traveling vehicle 10 is traveling (S11). In step S11, the traveling control section 31 determines whether or not the traveling vehicle 10 is traveling, on the basis of detection of rotation of the first traveling motor 28*a* and rotation of the second traveling motor 28*b*, the detection being carried out by the first encoder 27*a* and the second encoder 27*b*.

In a case where the first encoder 27*a* does not detect rotation of the first traveling motor 28*a* and the second encoder 27*b* does no detect rotation of the second traveling motor 28*b*, the traveling control section 31 determines that the traveling vehicle 10 is not traveling (S11: NO), and the process returns to step S11.

Meanwhile, in a case where the first encoder 27*a* detects rotation of the first traveling motor 28*a* and the second encoder 27*b* detects the second traveling motor 28*b*, the traveling control section 31 determines that the traveling vehicle 10 is traveling (S11: YES), the traveling control section 31 determines whether or not the position of the traveling vehicle 10 detected by the traveling sensor 29 changes (S12).

In a case where the position of the traveling vehicle 10 detected by the traveling sensor 29 changes (S12: YES), the traveling control section 31 determines that the traveling sensor 29 is normally operating, and the process returns to step S11.

Meanwhile, in a case where the position of the traveling vehicle 10 detected by the traveling sensor 29 does not change (S12: NO), the traveling control section 31 determines that an abnormality has occurred in the traveling sensor 29 (S13), and the traveling control section 31 stops rotation of the first traveling motor 28*a* and rotation of the second traveling motor 28*b* so as to cause the traveling vehicle 10 to stop (S14). With this process, the sensor abnormality detection process shown in FIG. 5 is ended.

The above-described stacker crane 1 in accordance with the present embodiment is configured as follows. Only in a case where all the slippage detecting sections, that is, the first slippage detecting section 34 and the second slippage detecting section 35 detect slippage of not less than the predetermined amount (S2: YES), the traveling control section 31 causes the traveling vehicle 10 to stop (S4).

Note here that, in the stacker crane 1, the masts 11 are provided to the traveling vehicle 10 in a standing manner. Therefore, when accelerated, the traveling vehicle 10 is likely to be tilted in the traveling direction. Thus, slippage is likely to occur at the wheel on the front side in the traveling direction of the traveling vehicle 10, whereas slippage is difficult to occur at the wheel on the rear side in the traveling direction since a large load is applied thereto.

The stacker crane 1 configured as above enables the following operation. That is, even when slippage occurs at one of the first wheel 21*a* and the second wheel 21*b* while the conveyance object M is being conveyed in the stacker crane 1, the traveling vehicle 10 can travel with the other wheel. This can avoid unnecessary stop of the traveling vehicle 10, thereby suppressing reduction in efficiency with which the stacker crane 1 conveys the conveyance object M.

Further, the first wheel 21*a*, which is a wheel of the first driving unit 41, is disposed at the front side of the traveling vehicle 10. Meanwhile, the second wheel 21*b*, which is a wheel of the second driving unit 42, is disposed at the rear side of the traveling vehicle 10. By arranging the first wheel 21*a* and the second wheel 21*b* at different positions, in the traveling direction, of the traveling vehicle 10 in this manner, it is possible to suppress a situation in which the stacker crane 1, which includes the masts 11 provided to the traveling vehicle 10 in a standing manner, is tilted in the traveling direction at the time of acceleration.

Further, in the sensor abnormality detection process shown in FIG. 5, in a case where it is determined that an abnormality such as a failure has occurred in the traveling sensor 29 (S13), the traveling control section 31 causes the traveling vehicle 10 to stop (S14).

Note here that, in a case where an abnormality occurs in the traveling sensor 29, a traveling speed calculated on the basis of changes in traveling position per unit time detected by the traveling sensor 29 would not change. In this case, the first servo amplifier 37 supplies an excessive electric current to the first traveling motor 28*a* so as to make the traveling speed closer to the target traveling speed. Consequently, the number of rotations of the first traveling motor 28*a* becomes excessively large, so that the traveling vehicle 10 is excessively accelerated.

In order to address this, according to the present embodiment, in a case where it is determined that an abnormality has occurred in the traveling sensor 29, the traveling control section 31 causes the traveling vehicle 10 to stop, thereby making it possible to prevent excessive acceleration of the traveling vehicle 10. With this, it is possible to secure safety when the stacker crane 1 conveys the conveyance object M.

Other Embodiments

In the description of the above-described embodiment, the traveling vehicle 10 includes two driving units, i.e., the first driving unit 41 and the second driving unit 42. However, the present invention is not limited to this. Alternatively, for example, the traveling vehicle 10 may include four driving units. This configuration may be configured as follows. That is, in a case where all slippage detection sections in the four driving units detect slippage of not less than a predetermined amount at the wheels, the traveling vehicle 10 may be caused to stop. Further, in a case where slippage detection sections in two or more of the four driving units detect slippage of not less than a predetermined amount at the wheels, the traveling vehicle 10 may be caused to stop.

In the description of the above-described embodiment, used as the position detecting section which detects the position of the traveling vehicle 10 along the track is the traveling sensor 29, which is a laser-type distance sensor. However, the present embodiment is not limited to this. For example, used as the position detecting section may be a bar code type distance meter including (a) a bar code provided to extend along the track and (b) a reading section which is provided to the traveling vehicle 10 and which reads the bar code.

Further, used as the position detecting section may be a magnetic-force detecting type distance meter which includes a magnet section having N poles and S poles arranged alternately at predetermined intervals along the track and which detects a position of the traveling vehicle 10 on the track on the basis of detection of changes in magnetic force of the magnet section. Furthermore, used as the position detecting section may be a distance meter including (a) a scale disposed on the traveling rail R1 and (b) an encoder which is disposed in the traveling vehicle 10 and which detects the scale.

In the description of the above-described embodiment, in a case where all the slippage detection sections detect, at least in a state where the traveling vehicle 10 is accelerated, slippage of not less than a predetermined amount, the traveling control section 31 causes the traveling vehicle 10 to stop. However, the present invention is not limited to this. Alternatively, for example, in a case where all the slippage detection sections detect slippage of not less than a predetermined amount in a state where the traveling vehicle 10 is traveling at a constant speed or in a state where the traveling vehicle 10 is decelerated, the traveling control section 31 may cause the traveling vehicle 10 to stop.

In the description of the above-described embodiment, the first slippage detecting section 34 detects slippage at the first wheel 21*a* on the basis of (a) the number of rotations of the first traveling motor 28*a* detected by the first encoder 27*a* and (b) an amount of change of a position, in the traveling direction, of the traveling vehicle 10 detected by the traveling sensor 29. However, the present invention is not limited to this. Alternatively, for example, the first slippage detecting section 34 may detect slippage at the first wheel 21*a* by determining whether or not a difference between (a) a traveling distance of the traveling vehicle 10 calculated on the basis of a torque instruction value from the first servo amplifier 37 and (b) an amount of change of a position, in the traveling direction, of the traveling vehicle 10 detected by the traveling sensor 29 is not less than a predetermined threshold.

Further, in the description of the above-described embodiment, in a case where a position, in the traveling direction, of the traveling vehicle 10 detected by the traveling sensor 29 does not change while the traveling vehicle 10 is traveling, the traveling vehicle 10 is caused to stop. However, the present invention is not limited to this. Alternatively, for example, a torque sensor which detects a torque loaded to the second wheel 21*b* may be provided. In a case where a torque detected by the torque sensor is not less than a predetermined threshold, the traveling vehicle 10 may be caused to stop. With this, it is possible to prevent excessive rotation and overheating of the second traveling motor 28*b*.

Furthermore, in the description of the above-described embodiment, the first servo amplifier 37 carries out torque control for obtaining a torque instruction value so as to make a difference between the traveling speed and the target traveling speed 0 (zero). However, the present invention is not limited to this. The first servo amplifier 37 may carry out proportional integral control for carrying out proportional control and integral control on the basis of the difference between the traveling speed and the target traveling speed.

Aspects of the present invention can also be expressed as follows:

A conveyance device in accordance with a first aspect of the present disclosure includes: a traveling vehicle which travels along a track; a mast provided to the traveling vehicle in a standing manner; a raising and lowering section which holds a conveyance object and which is raised and lowered along the mast; and a control section. The traveling vehicle includes a plurality of driving units each including a wheel which rolls on the track, a motor which drives the wheel, and a slippage detection section which detects slippage at the wheel. The control section causes the traveling vehicle to stop, in a case where two or more slippage detection sections out of the slippage detection sections detect, at least in a state where the traveling vehicle is accelerated, slippage of not less than a predetermined amount at the wheels.

According to the configuration described above, the plurality of wheels are provided. Thanks to this, even if slippage occurs at one wheel, the traveling vehicle can travel with remaining wheels. Only in a case where occurrence of slippage at two or more wheels is detected, the traveling vehicle is caused to stop. This configuration makes it possible to reduce a frequency at which the traveling vehicle stops, thereby making it possible to suppress reduction in efficiency with which the conveyance device conveys a conveyance object.

A conveyance device in accordance with a second aspect of the present disclosure may be configured such that, in the first aspect, the control section causes the traveling vehicle to stop, in a case where all the slippage detection sections detect, at least in a state where the traveling vehicle is accelerated, slippage of not less than a predetermined amount at the wheels.

According to the configuration described above, only in a case where occurrence of slippage is detected at all the plurality of wheels, the traveling vehicle is caused to stop. With this, it is possible to reduce the frequency at which the traveling vehicle stops as much as possible, thereby making it possible to further suppress reduction in efficiency with which the conveyance device conveys a conveyance object.

A conveyance device in accordance with a third aspect of the present disclosure may be configured such that, in the first or second aspect, the conveyance device further includes a position detecting section which detects a position of the traveling vehicle along the track. Each of the slippage detection sections detects the slippage on a basis of the number of rotations of the motor and an amount of change of the position detected by the position detecting section.

According to the configuration described above, each of the slippage detection sections can detect the slippage on the basis of (a) the number of rotations of the motor and (b) the amount of change of the position detected by the position detecting section. Thus, it is possible to cause the traveling vehicle to stop at a desired timing.

A conveyance device in accordance with a fourth aspect of the present disclosure may be configured such that, in the third aspect, each of the slippage detection sections makes threshold determination by determining whether or not a difference between (a) a traveling distance of the traveling vehicle calculated on a basis of the number of rotations of the motor and (b) an amount of change of the position detected by the position detecting section is not less than a predetermined threshold, and in a case where the difference is not less than the threshold, said each of the slippage detection sections determines that slippage of not less than the predetermined amount at the wheel has occurred.

According to the configuration described above, by setting an appropriate threshold for the threshold determination, it is possible to quickly detect occurrence of slippage at a wheel.

A conveyance device in accordance with a fifth aspect of the present disclosure is configured such that, in any one of the first to fourth aspects, the plurality of driving units include a first driving unit and a second driving unit. The wheel of the first driving unit and the wheel of the second driving unit may be arranged in different positions, in the traveling direction, of the traveling vehicle.

According to the configuration described above, the wheel of the first driving unit and the wheel of the second driving unit are arranged in different positions, in the traveling direction, of the traveling vehicle. Consequently, it is possible to suppress tilting of the conveyance device in the traveling direction at the time of acceleration, thereby making it possible to effectively suppress reduction in conveyance efficiency of the conveyance object.

A conveyance device in accordance with a sixth aspect of the present disclosure may be configured such that, in any one of the first to fifth aspects, in a case where the position detected by the position detecting section does not change while the traveling vehicle is traveling due to rotation of the motors of the driving units, the control section determines that an abnormality has occurred in the position detecting section and causes the traveling vehicle to stop.

According to the configuration described above, in a case where it is determined that an abnormality has occurred in the position detecting section, the control section causes the traveling vehicle to stop. With this, it is possible to prevent excessive acceleration of the traveling vehicle, thereby making it possible to enhance the safety of the conveyance device.

A conveyance device in accordance with a seventh aspect of the present disclosure may be configured such that, in the third aspect, each of the slippage detection sections carries out the threshold determination every time the motor makes predetermined rotation.

According to the configuration described above, the threshold determination is made every time the motor makes predetermined rotation. This makes it possible to detect occurrence of slippage at each wheel at an early timing.

A conveyance device in accordance with an eighth aspect of the present disclosure may be configured such that, in any one of the first to seventh aspects, each of the plurality of driving units includes a notifying section which notifies, to an external entity, that the slippage detection section detects slippage of not less than the predetermined amount at the wheel, in a case where the detection is made.

According to the above configuration, each of the plurality of driving units includes the notifying section, and each notifying section makes notification corresponding to the wheel at which slippage occurs. With this, for example, in a case where slippage occurs only at a part of the wheels, a user can identify the part of the wheels and carry out an appropriate process.

The present disclosure is not limited to the above-described embodiments, but can be altered by a skilled person in the art within the scope of the claims. The present disclosure also encompasses, in its technical scope of the present disclosure, any embodiment derived by combining technical means disclosed in differing embodiments.

REFERENCE SIGNS LIST

1: stacker crane
10: traveling vehicle
11: mast
12: raising and lowering section
13: transfer device
21*a*: first wheel
21*b*: second wheel
22: raising and lowering motor
24: first notifying section
25: second notifying section
26: raising and lowering sensor
27*a*: first encoder
27*b*: second encoder
28*a*: first traveling motor
28*b*: second traveling motor
29: traveling sensor
30: control device
31: traveling control section
32: raising and lowering control section
33: transfer control section
34: first slippage detecting section
35: second slippage detecting section
41: first driving unit
42: second driving unit

The invention claimed is:

1. A conveyance device comprising:
a traveling vehicle which travels along a track;
a mast provided to the traveling vehicle in a standing manner;
a raising and lowering section which holds a conveyance object and which is raised and lowered along the mast; and
a control section,
the traveling vehicle including a plurality of driving units each including a wheel which rolls on the track, a motor which drives the wheel, and a slippage detection section which detects slippage at the wheel,
the control section causing the traveling vehicle to stop, in a case where two or more slippage detection sections out of the slippage detection sections detect, at least in a state where the traveling vehicle is accelerated, slippage of not less than a predetermined amount at the wheels.

2. The conveyance device according to claim 1, wherein:
the control section causes the traveling vehicle to stop, in a case where all the slippage detection sections detect, at least in a state where the traveling vehicle is accelerated, slippage of not less than a predetermined amount at the wheels.

3. The conveyance device according to claim 1, further comprising:
a position detecting section which detects a position of the traveling vehicle along the track, wherein
each of the slippage detection sections detects the slippage on a basis of the number of rotations of the motor and an amount of change of the position detected by the position detecting section.

4. The conveyance device according to claim 3, wherein:
each of the slippage detection sections makes threshold determination by determining whether or not a difference between (a) a traveling distance of the traveling vehicle calculated on a basis of the number of rotations of the motor and (b) an amount of change of the position detected by the position detecting section is not less than a predetermined threshold, and in a case where the difference is not less than the threshold, said each of the slippage detection sections determines that slippage of not less than the predetermined amount at the wheel has occurred.

* * * * *